UNITED STATES PATENT OFFICE 2,172,291

INHIBITOR AND THE USE THEREOF

Richard H. Patch, Jenkintown, Pa., assignor to E. F. Houghton & Co., Philadelphia, Pa., a corporation of Pennsylvania No Drawing. Application December 28, 1938, Serial No. 248,141

18 Claims. (Cl. 148—8)

My invention relates to a new inhibitor and to the use thereof, and more particularly it relates to a new acid solution in which the solvent action of the acid on iron and steel will be reduced to a minimum. The invention provides an acid solution which may be transported in iron or steel containers or used as a pickling solution to remove scale and rust from iron and steel surfaces without attacking appreciably the iron or steel itself.

The principal object of the invention, therefore, is to provide an acid solution, for example, a sulphuric acid solution, which may be employed as a pickling solution for the removal of the oxidized material on the surface of iron and steel with assurance that pitting and corrosion of the surface of the metal itself will be minimized or entirely prevented.

Still another object of the invention is to provide an acid solution which, due to the presence of a novel inhibitor, may safely be transported and stored in iron or steel containers, since the inhibitor functions to render the acid substantially inert to the metal with the result that the interior of the container is not corroded and the acid solution is not contaminated by dissolved metal compounds.

Other objects, including the novel pickling process, will be apparent from a consideration of the specification and claims.

Acids and acid materials readily attack iron and steel and, therefore, great difficulties are encountered in the storing and shipping thereof. If iron or steel containers are used, the length of their life is short, and the hazard of leakage is always present with its attending danger to property and human life. In the so-called pickling processes, a solution of a non-oxidizing acid, or a material furnishing one, is used to remove the scale or rust from the surface of the iron or steel. In order to be of practical use, however, the surface of the iron and steel must remain bright and smooth, for otherwise the objects are unfit for galvanizing and use in the trade. The acid first removes the scale and rust but, when these have been removed, it attacks the metal below, pitting and roughening the surface thereof with the accompanying evolution of disagreeable and corrosive gases which endanger the health of the workman, and also destroy the steel and construction materials of the pickling plant. It is not possible using acid solution alone to remove the scale or rust without also attacking the metal for there is no indication when the process should be stopped. Furthermore, the rust and scale usually do not cover the metal surface uniformly and, therefore, the acid dissolves the scale at one point on the surface while at some adjacent point where the scale has been removed, the surface of the metal is attacked by the acid, causing pitting and loss of metal.

My invention is characterized by the use of a novel inhibitor which is added in small amounts to the acid solution, which inhibitor minimizes or prevents the acid from attacking the iron or steel surface without reducing the effectiveness of the acid in removing the rust or scale. The addition of various substances, generally of an organic nature, has from time to time been suggested. The usefulness of these materials depends to a large extent on their efficiency, that is to say, it depends on the amount of inhibitor needed for each pound of acid consumed in the pickling operation, and also their ability to leave the surface of the pickled metal clean without blackening or other discoloration of the metal. The inhibitor of the present invention has many advantages over those heretofore known, for example, it is more effective, and is stable in the acid solution at high as well as at low temperatures. The inhibitor of the invention effectively retards the action of the acid upon the metal itself without hindering the removal of the mill scale or other incrustation on the metal surface. The inhibitor is completely soluble in pickling solutions, so that the pickling bath may be easily and completely rinsed from the metal articles, without leaving a residue of tarry or other material adhering to the surface of the metal. The inhibitor may be used with any pickling bath or acid solution, for example, hydrochloric acid, acetic acid, or bisulphate solutions, as well as sulphuric acid solutions. Since the last mentioned is the most common pickling material, the invention will be particularly described in conjunction therewith.

My invention contemplates the presence in the acid pickling solution of a small amount of a product comprising a sulphurized alkaloid and a heterocyclic five-membered ring compound containing both sulphur and nitrogen atoms.

The sulphurized alkaloid may be any of the products obtained by heating an alkaloid with sulphur, sulphur chloride or other substance which releases sulphur upon heating, either direct or in the presence of a catalyst such as aluminum chloride. The alkaloid which is sulphurized may be any of the large number of compounds falling within this designation, and may be a relatively pure substance, or a mixture of various alkaloids with or without other materials, such, for example, as the cinchona alkaloids and those that act similarly thereto. The term "sulphurized cinchona alkaloids" as used herein, therefore, includes sulphurized quinine, sulphurized quinidine, sulphurized cinchonine, sulphurized quinoidine, and equivalent sulphurized alkaloids. The sulphurized cinchona alkaloid employed may, for example, correspond to any of the sulphurized products disclosed in United States Patent No. 1,867,414, issued July 13, 1932, and the sulphurized alkaloid may be prepared by any of the methods there set forth. Since quinoidine is the product remaining after some or all of the crystallizable alkaloids have been removed, it is relatively cheap and is given herein as typical of the alkaloids which may be sulphurized and used in the formation of the inhibitor. The nature of the sulphurized products is very complex and may include the alkyl sulphides, the mercaptans, the mercaptoles, the disulphides, the sulphoxides, the sulphones, and the sulphinic and sulphuric acid substitution products.

The heterocyclic five-membered ring compound containing both sulphur and nitrogen is exemplified by the various thiazoles, particularly the aryl thiazoles, such as benzothiazole, tolylthiazole, phenylthiazole, and the mercaptan, sulphide, disulphide, and sulphonate derivatives thereof. Mercaptobenzothiazole and 2 mercapto-4 phenyl benzothiazole are specific examples of the type of compound included within the term.

The sulphurized alkaloid and the heterocyclic compound may be mixed and the product then added to the pickling solution; or the components of the product may be separately added to the picking solution. The components may vary from 85% to 15% of the sulphurized alkaloid and from 15% to 85% of the heterocyclic compound, based on the total weight of the two components present. Generally, on this basis, the sulphurized alkaloid will be present from 75% to 55%, and the heterocyclic compound from 25% to 45%. In order to furnish the ingredients in the manner best suited for convenient handling and for distribution in the acid solution, the two compounds are preferably mixed with sodium or potassium chloride before addition to the pickling solution. The amount of alkali metal halide may vary as desired from a small amount, for example 10% to 80% or even higher. When using sulphurized quinoidine and mercaptobenzothiazole, a suitable formula which gave especially advantageous results is:

| | Parts |
|---|---|
| Sulphurized quinoidine | 20 |
| Mercaptobenzothiazole | 10 |
| Sodium chloride | 70 |

Since the inhibiting properties of the product of the present invention are much more marked than that of either of the components thereof, and since these and other properties are superior to those expected from a knowledge of the properties of the sulphurized alkaloid on the one hand and of the heterocyclic compound on the other, it is likely that there is a reaction between the two components to form a complex reaction product. This is particularly marked in the case of the product containing about 20 parts of sulphurized quinoidine to about 10 parts of mercaptobenzothiazole. It is to be understood, however, that the explanation of the possible reason for the advantageous properties of the inhibitor of the present invention is not to be understood as limiting the subject matter herein set forth and claimed.

The inhibitor of the present invention may be used with pickling baths containing the various non-oxidizing acids used for the purpose, such as sulphuric acid, hydrochloric acid and the like, and with pickling solutions of various strengths. In general, the inhibitor, depending upon the requirements of the particular iron or steel being treated will be used in very small amounts and may vary from 1 part of inhibitor to 100 parts of acid to 1 part of inhibitor to 1000 parts of acid.

To illustrate the efficiency of the reaction product or condensate formed, the following table shows the comparative results:
1. Action of raw acid with no inhibitor.
2. Action of acid with sulphurized quinoidine.
3. Action of acid with mercaptobenzothiazole.
4. Action of acid with invented condensate, reacted in the proportions given in the specific formula.

All tests were made on 1010 hot rolled steel strips having a surface area of 10 square inches. The inhibitors were weighed in the proportion of 1 part inhibitor to 400 parts of sulphuric acid, the latter being used in a concentration of 5% by volume or 9% by weight, the diluent being water.

| | 1 | 2 | 3 | 4 |
|---|---|---|---|---|
| Loss in weight (grams) 20 minutes at 180° F | 1.0442 | 0.0147 | 0.0835 | 0.0070 |
| Percent loss in weight | 4.0 | 0.05 | 0.32 | 0.03 |
| Loss in weight (grams) 20 minutes at boiling temperature | 2.3789 | 0.0660 | 0.9145 | 0.0240 |
| Percent loss in weight | 9.2 | 0.25 | 3.45 | 0.097 |

Note: Tests were run at boiling temperature after the solutions had been boiled for two hours to accelerate the break down of the inhibitors used.

Therefore, it can be seen that at 180° F. the condensate inhibitor of the invention is more effective than either of the other two inhibitors; that the same relationship is apparent in the tests at 214° F., and it also should be noted that the alkaloid condensate inhibitor is far more stable at elevated temperatures than either of the organic reacting materials used separately.

The choice of the particular sulphurized alkaloid and heterocyclic compound reacted will be determined by economic conditions, and the properties of the particular iron and steel to which the acid is brought in contact.

I claim:
1. The process of pickling articles which comprises subjecting said articles to the action of a dilute non-oxidizing acid solution in which there is present a small quantity of a product comprising a sulphurized cinchona alkaloid and a heterocyclic five-membered ring compound containing both sulphur and nitrogen atoms.

2. The process of pickling articles which comprises subjecting said articles to the action of a dilute non-oxidizing acid solution in which there is present a small quantity of a product comprising a sulphurized cinchona alkaloid and a thiazole compound.

3. The process of pickling articles which comprises subjecting said articles to the action of a dilute non-oxidizing acid solution in which there is present a small quantity of a product comprising a sulphurized cinchona alkaloid and an aryl thiazole.

4. The process of pickling articles which comprises subjecting said articles to the action of a dilute non-oxidizing acid solution in which there is present a small quantity of a product comprising sulphurized quinoidine and mercaptobenzothiazole.

5. The process of claim 4 wherein the sulphurized quinoidine is present in amounts approximately twice that of the mercaptobenzothiazole.

6. A pickling solution for metal articles comprising a dilute non-oxidizing acid solution in which there is present a small quantity of a product comprising a sulphurized cinchona alkaloid and a heterocyclic five-membered ring compound containing both sulphur and nitrogen atoms.

7. A pickling solution for metal articles comprising a dilute non-oxidizing acid solution in which there is present a small quantity of a product comprising a sulphurized cinchona alkaloid and a thiazole compound.

8. A pickling solution for metal articles comprising a dilute non-oxidizing acid solution in which there is present a small quantity of a product comprising a sulphurized cinchona alkaloid and an aryl thiazole.

9. A pickling solution for metal articles comprising a dilute non-oxidizing acid solution in which there is present a small quantity of a product comprising sulphurized quinoidine and mercaptobenzothiazole.

10. The solution of claim 9 wherein the sulphurized quinoidine is present in amounts about twice that of the mercaptobenzothiazole.

11. A composition possessing inhibiting action for addition to a pickling solution comprising a sulphurized cinchona alkaloid, a heterocyclic five-membered ring compound containing both sulphur and nitrogen atoms, and an alkali metal halide.

12. A composition possessing inhibiting action for addition to a pickling solution comprising a sulphurized cinchona alkaloid, a thiazole compound, and an alkali metal chloride.

13. A composition possessing inhibiting action for addition to a pickling solution comprising a sulphurized cinchona alkaloid, an aryl thiazole, and an alkali metal chloride.

14. A composition possessing inhibiting action for addition to a pickling solution comprising sulphurized quinoidine, mercaptobenzothiazole, and sodium chloride.

15. A composition possessing inhibiting action for addition to a pickling solution comprising sulphurized quinoidine about 20%, mercaptobenzothiazole about 10%, and sodium chloride about 70%

16. The process of pickling articles which comprises subjecting said articles to the action of a dilute non-oxidizing acid solution in which there is present a small quantity of a product comprising sulphurized quinoidine and 2 mercapto-4 phenyl benzothiazole.

17. A composition possessing inhibiting action for addition to a pickling solution comprising a sulphurized cinchona alkaloid and a heterocyclic five-membered ring compound containing both sulphur and nitrogen atoms.

18. A composition possessing inhibiting action for addition to a pickling solution comprising sulphurized quinoidine and 2 mercapto-4 phenyl benzothiazole.

RICHARD H. PATCH.